May 14, 1929. H. S. WOOLLEY 1,713,315
ELBOW FITTING FOR MEASURING INSTRUMENTS
Filed April 27, 1927
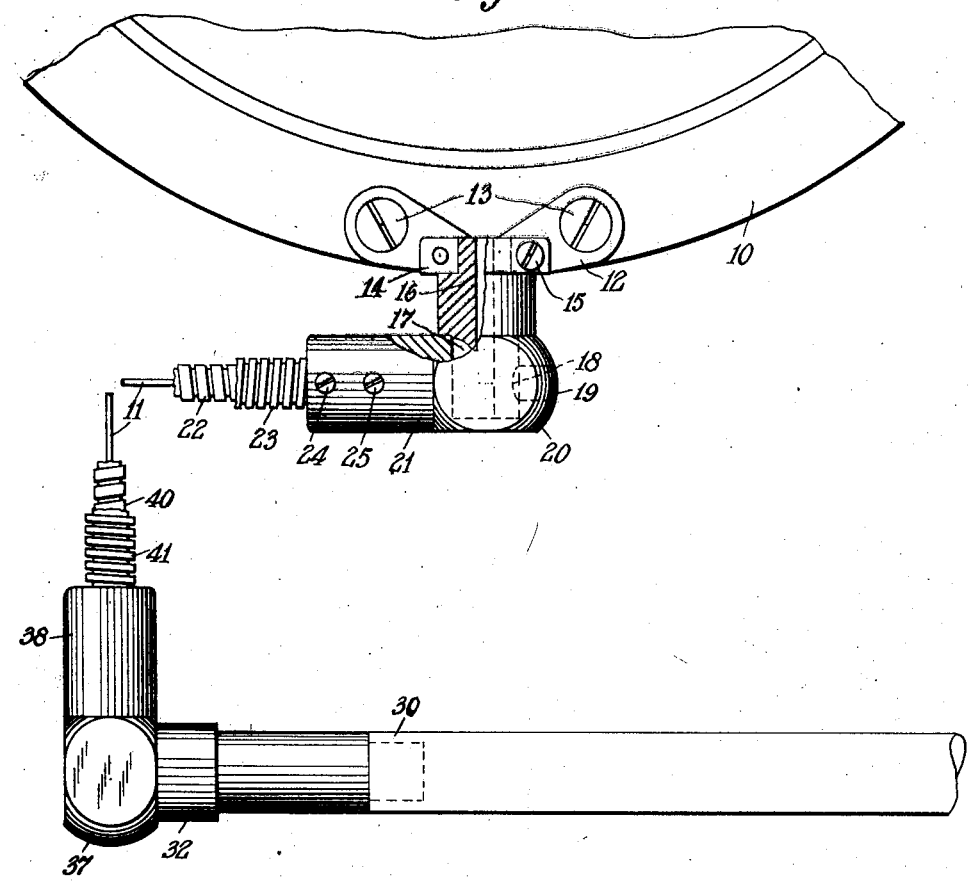
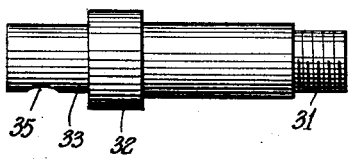
INVENTOR
Henry S. Woolley
BY
ATTORNEY Patented May 14, 1929.

1,713,315

UNITED STATES PATENT OFFICE.

HENRY S. WOOLLEY, OF WATERBURY, CONNECTICUT, ASSIGNOR TO THE BRISTOL COMPANY, OF WATERBURY, CONNECTICUT, A CORPORATION OF CONNECTICUT.

ELBOW FITTING FOR MEASURING INSTRUMENTS.

Application filed April 27, 1927. Serial No. 187,022.

The invention relates to a fitting for affording a right-angled connection or joint to, for example, a temperature responsive element as well as to the measuring instrument associated therewith for providing a visual indication or record of the temperature to which such responsive element is exposed, a pliable capillary tube filled with fluid being employed to transmit the effect of temperature changes as is well understood.

An object of the invention resides in the provision of a novel fitting or coupling member which will afford a close-up connection so that the lead-out portion of the coupling, for example, will not project unduly from the face of the instrument casing and thus admit of compact packing for shipping purposes and render the same less subject to injury, as well as adding to the attractiveness of the instrument. The capillary tube employed to connect the temperature responsive element with the instrument is generally protected with a suitable flexible armored cable between the outer ends of the two fitting members respectively associated therewith; and it will be understood that after the capillary tube has been strung through the pairs of elements constituting the respective fitting members, the said elements of each member must be assembled and secured to their associated measuring units. A further object of the invention, therefore, resides in a construction of fitting which will not only admit of readily securing a fitting in position but also in the provision of a slot in one of the elements to allow of the capillary tube assuming a sharp turn or bend at the right-angle portion of the fitting, so that the outer portion of the fitting will be displaced the minimum distance from the instrument portion to which it is attached.

In the accompanying drawings which illustrate one embodiment of the invention:

Fig. 1 is a plan view illustrating a pair of coupling members attached respectively to the back of an instrument casing and to a temperature responsive element.

Fig. 2 is a plan view of a coupling member with the elements thereof shown separated from each other.

Fig. 3 is a sectional view through an assembled coupling member.

Referring to the drawings, 10 designates an instrument casing to the back of which one of the pair of fittings or coupling members hereinafter described may be attached, for example, in order to provide a protected lead-in for the instrument end of a capillary tube 11 adapted to contain a fluid for effecting the desired movement of an indicator or recording pointer (not shown) of said instrument, as is well understood in the art. A bracket member 12 is employed to receive the coupling member and may be secured to the casing 10 by means of the screws 13. The said bracket has an upstanding wall portion 14 made in two parts held together by the screws 15 to clamp the inner reduced cylindrical end 16 of one of the coupling elements, the same shouldering against the up-standing portion 14 of the bracket 12. The outer end of the said element is also reduced in diameter and the element as a whole is axially bored through to admit the capillary tube to the interior of the casing 10. Furthermore, the reduced outer portion is slotted, as at 17, inwardly from its extreme outer end to meet the axial bore of said element; and the surface opposite said slot 17 is provided with a recess or indentation 18 to receive a set screw 19 passing through the wall of the associated element which directs the capillary tube 11 at right angles to its position in the instrument element.

The said element surrounding the reduced outer portion of the instrument element of the coupling comprises the head portion 20 through which the set screw 19 passes and whereby the two elements may be held together in a predetermined relationship through said set screw 19 of the latter fitting into said recess 18 of the former. Head 20 is provided, also, with a cylindrical extension 21 for receiving the double armored, flexible cables 22 and 23 for the capillary tube and which are threaded into the outer end of said extension 21 and held in place by respective set screws 24 and 25.

Similarly, the bulb 30, in which the capillary tube 11 terminates and which bulb is intended for insertion into the medium whose temperature it is desired to ascertain, may be provided with a fitting or coupling member to introduce said capillary tube thereto. As shown more particularly in Figs. 2 and 3 of the drawings, the bulb element of the fitting comprises a cylindrical member axially bored through and having a reduced threaded portion 31 adapted to be screwed into the outer end of bulb 30, an intermediate collar 32 of said element shouldering against the wall of the outer end of the other coupling element. Beyond this collar, said element is provided with the cylindrical portion 33 of reduced diameter and which has a slot 34 directed inwardly from its outer end meeting the axial bore of said element. Moreover, directly opposite this slot there is provided in the outer surface of the portion 33 a recess or indentation 35 for receiving a set screw 36 for uniting the two elements of the coupling member in a predetermined fixed relationship similar to the previously described elbow-fitting arrangement of the instrument casing. Over said portion 33 is to be fitted the other element of the coupling member, the same comprising the head 37 through which passes said set screw 36, said head shouldering against the collar 32 and having a cylindrical extension 38 which is axially bored through to meet the slot 34 of the coacting element when said parts are assembled as indicated in Fig. 3 of the drawings. Furthermore, at the junction of the cylindrical bore of the portion 38 with the slot 34, the said cylindrical portion is preferably beveled off as indicated at 39 and on the side where the turn in the capillary tube is to be made, thus affording a greater range of movement of the capillary tube in the coupling so that the two elements may more readily be assembled when strung upon the said capillary tube.

It will be understood that both pairs of elements, that is to say the elements of the instrument coupling member and the elements of the bulb coupling member must be strung upon the capillary tube before the final connections are made respectively to the instrument 10 and to the bulb 30. In other words, the slotted element is first secured to the instrument 10 through the bracket 12 in the manner aforesaid, whereupon the head 20 of the coacting element is fitted over the outer projecting cylindrical portion, the slot 17 allowing of the ready manipulation of the capillary tube in the placing of these two elements in the position noted and wherein they are secured through the set screw 19. It will be further noted that the movement of the capillary tube is not restricted, as is the case in the usual practice, by the axial bore of the one element but may freely move through the slot 17 as well as in the cavity of the head 20 until the coupling parts are brought into proper relationship.

In like manner, the bulb fitting is secured in position, the one element having the threaded inner end 31 being first secured in position in the bulb by turning the latter thereon until its outer end shoulders against the collar 32; whereupon the head 37 is fitted over outer cylindrical portion 33 and the parts secured in the predetermined position for providing slot 34 in the plane of the axial bore of the portion 38. The capillary tube then extends beyond said portion 38, being protected by the armored cables 40 and 41 screwed into the corresponding end of portion 38 and held thereto by the set screws 42 and 43 respectively.

By the foregoing arrangement, very little play need be provided between the two co-acting elements of a fitting or coupling member in mounting the one upon the other, so that they may be brought very closely together and afford a compact fitting for the purpose indicated.

I claim:

1. An elbow fitting for affording a right-angled connection of a tube to a portion of a measuring instrument comprising two separable elements, each of which has an outer attaching portion and one being provided with a lateral opening at its opposite end to receive the inner end of the other element, the inserted element being bored through axially and the other bored axially from its outer end to meet the bore of the inserted element, the latter at its inner end being slotted into its bore, and a set screw passing through a threaded opening of the receiving element to fit a recess of the inserted element to maintain the two said elements in a predetermined fixed relationship.

2. An elbow fitting for affording a right-angled connection of a tube to a portion of a measuring instrument, comprising two separable elements, each of which has an outer attaching portion and one being provided with a lateral opening at its opposite end to receive the inner end of the other element, the inserted element being bored through axially and the other bored axially from its outer end to meet the bore of the inserted element, the latter at its inner end being slotted into its bore and the coacting portion of the bore of the receiving element being beveled off, and a set screw passing through a threaded opening of the receiving element to fit a recess of the inserted element to maintain the two said elements in a predetermined fixed relationship.

In testimony whereof I affix my signature.

HENRY S. WOOLLEY.